United States Patent [19]
Scherrer

[11] 3,886,838
[45] June 3, 1975

[54] DEVICE FOR TEACHING MUSICAL NOTE RECOGNITION

[76] Inventor: Robert John Scherrer, 8146 Gannon St., St. Louis, Mo. 63130

[22] Filed: Feb. 21, 1974

[21] Appl. No.: 444,531

[52] U.S. Cl. ................................. 84/470; 84/484
[51] Int. Cl. ............................................ G09b 15/00
[58] Field of Search ............ 84/464, 470, 476, 477, 84/DIG. 6, 471, 477 R, 478, 479, 482, 484

[56] References Cited
UNITED STATES PATENTS

| | | | |
|---|---|---|---|
| 1,484,795 | 2/1924 | Munsell | 84/464 X |
| 1,913,233 | 6/1933 | De Francesco | 84/464 |
| 2,447,213 | 8/1948 | Sledge | 84/470 |
| 2,516,579 | 7/1950 | Leonardson | 84/470 X |
| 2,788,699 | 4/1957 | Pipkin | 84/470 |
| 2,888,849 | 6/1959 | Humphrey et al. | 84/470 X |
| 3,124,028 | 3/1964 | Elston | 84/470 X |
| 3,379,087 | 4/1968 | Weitzner | 84/478 |
| 3,577,824 | 5/1971 | Lavan | 84/470 X |
| 3,623,393 | 11/1971 | Vollero | 84/470 |
| 3,736,832 | 6/1973 | Franke et al. | 84/464 |
| 3,777,134 | 12/1973 | Conner | 84/470 X |

*Primary Examiner*—Richard B. Wilkinson
*Assistant Examiner*—Stanley J. Witkowski
*Attorney, Agent, or Firm*—Rogers, Ezell & Eilers

[57] ABSTRACT

This invention relates to an electronic device for teaching musical note recognition wherein notes represented by lights are randomly displayed on a display screen, the screen having selected musical clefs thereon. The notes are displayed in a random manner so that response must be to the notes themselves rather than a recognized display pattern. There is also included in the device the capability, at the operator's option, of identifying the notes as they are displayed, and further of selecting a musical key to which the displayed notes are to relate. Note and key identification are also represented by lighted symbols displayed on the display screen with a note identification symbol being displayed with each note.

20 Claims, 5 Drawing Figures

DEVICE FOR TEACHING MUSICAL NOTE RECOGNITION

SUMMARY OF THE INVENTION

This invention relates to a device for teaching musical note recognition, and particularly such a device which automatically and continually displays notes on a musical scale in a random manner for recognition by the user.

Various types of electronic devices for teaching music are known to exist and some of these include the activation of lights behind apertures, lenses, or the like to indicate notes on a musical scale. However, with such known devices the notes are not randomly generated. The problem is that the student soon learns the pattern in which the notes are displayed and thereafter responds to the pattern rather than the notes themselves, thus destroying the fundamental purpose of the device.

Hence, it is a primary object of this invention to improve one's ability to recognize notes appearing on, above, and below the treble, bass, alto, and tenor clefs. Another primary object of the invention is to coordinate key signature recognition of both sharps and flats with pitch recognition.

This invention accomplishes these objectives in a very effective, efficient, and educationally sound manner. A combination of three features allows the user optimum control over the variable necessary in learning notes and the effect key signatures have on them. First, the notes appear randomly within the parameters of a selected range. This means that all the notes in a given range have an equal chance to appear. The user must respond to the note and not to a pattern of notes or intervals which he has perceived beforehand. Second, the notes appear at an even rate of speed which can be regulated by the user. This feature elicits an even rate of response from the user which can be accelerated at his own discretion. Third, the device has a display which, at the option of the user, shows the name of the illustrated note and whether it is affected by an accidental. When the name display is operating, the user receives instantaneous reinforcement and feedback which is necessary to the learning process. Means are provided for the user to stop the cycle on a note which might need clarification and check his response with the name display. Means are also provided whereby the user can disable the automatic feature of the device and manually advance the display one note at a time. However, even in the manual mode the notes displayed with each advancement are random and therefore not predictable.

The result is a device that effectively tests the student's ability to recognize notes and that, therefore, closely simulates the difficulties encountered by the musician in sight reading music.

This device can be used by a teacher in a class or private situation to help students overcome deficiencies in key signatures and note recognition. It can also be used as a selfinstructional tool with which an individual might improve these skills. The device might also be used in a variety of other ways such as, for example, requiring the student instrumentalist to play on the instrument the notes displayed on the device as they appear.

In summary, the device of this invention offers all of the features making it a desirable tool for teaching the sight reading of music including the automatic and random display of notes together with regulatory and feedback features.

Hence, it is still another primary object of this invention to provide an electronic device for automatically and continually displaying notes on musical scales in a random manner for attempted recognition by the user.

These and other objects of the invention will become apparent from the drawings and detailed description to follow.

DETAILED DESCRIPTION OF A PREFERRED EMBODIMENT

Figure 1:
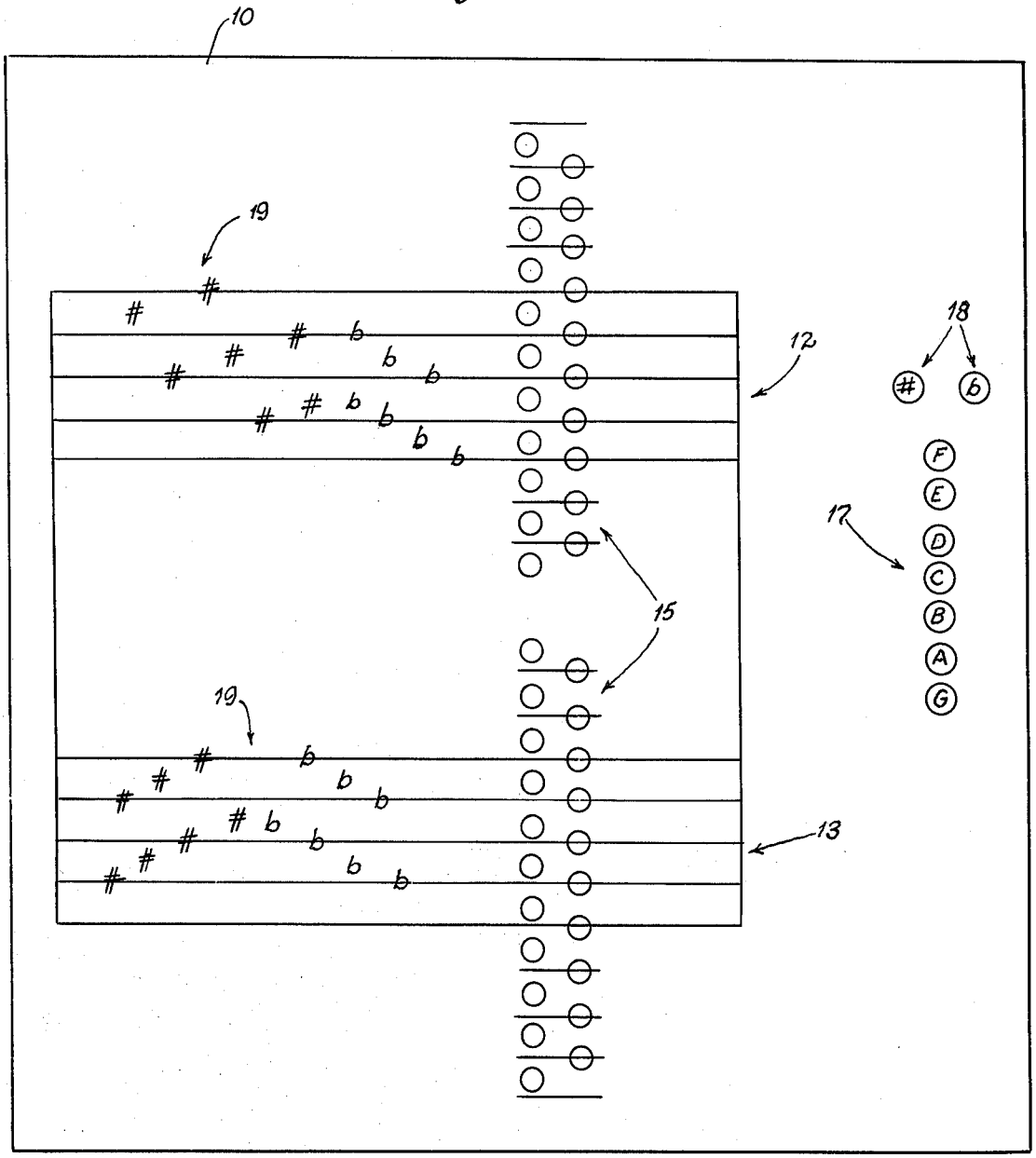
FIG. 1 is a front view of a typical display screen used with the device of this invention.

In FIG. 1 there is shown a typical display screen 10 used with the device of this invention. The screen 10 would be mounted at the front of a case (not shown) for housing the components of the electrical circuit to be described. The screen 10 is preferably of a translucent material having scale markings 12 and 13 thereon. The scale markings represent the treble and bass musical clefs, respectively, and it is contemplated that an alternate display screen would be provided substantially identical to the one shown but with the scales 12 and 13 representing the alto and tenor clefs, respectively.

The remaining information shown in FIG. 1 is not actually part of the display screen 10, but rather represents lights mounted behind the screen at selected locations and which are selectively activated to represent musical notes, the identification of notes displayed, or the key to which the notes are to relate. Hence, there are a series of lights 15 which are so positioned behind the scales 12 and 13 such that each light when activated represents a musical note. There are also a series of lights 17 which are located off the scale, each identifying a displayed note. Associated with the lights 17 are lights 18 which identify whether the note displayed is a sharp or a flat. Finally, there are a set of lights 19 which can be selectively activated to display sharp or flat symbols identifying the key to which the displayed notes are to relate.

As will be seen, the lights 15 are activated randomly one at a time with note changes either at the command of the operator or automatically at a rate which can be selected by the operator. The lights 17 and 18 can be made operable or inoperable as desired to identify the note displayed when operable. Selected ones of the lights 19 can be activated to designate a key to which the displayed notes relate.

Figure 2:
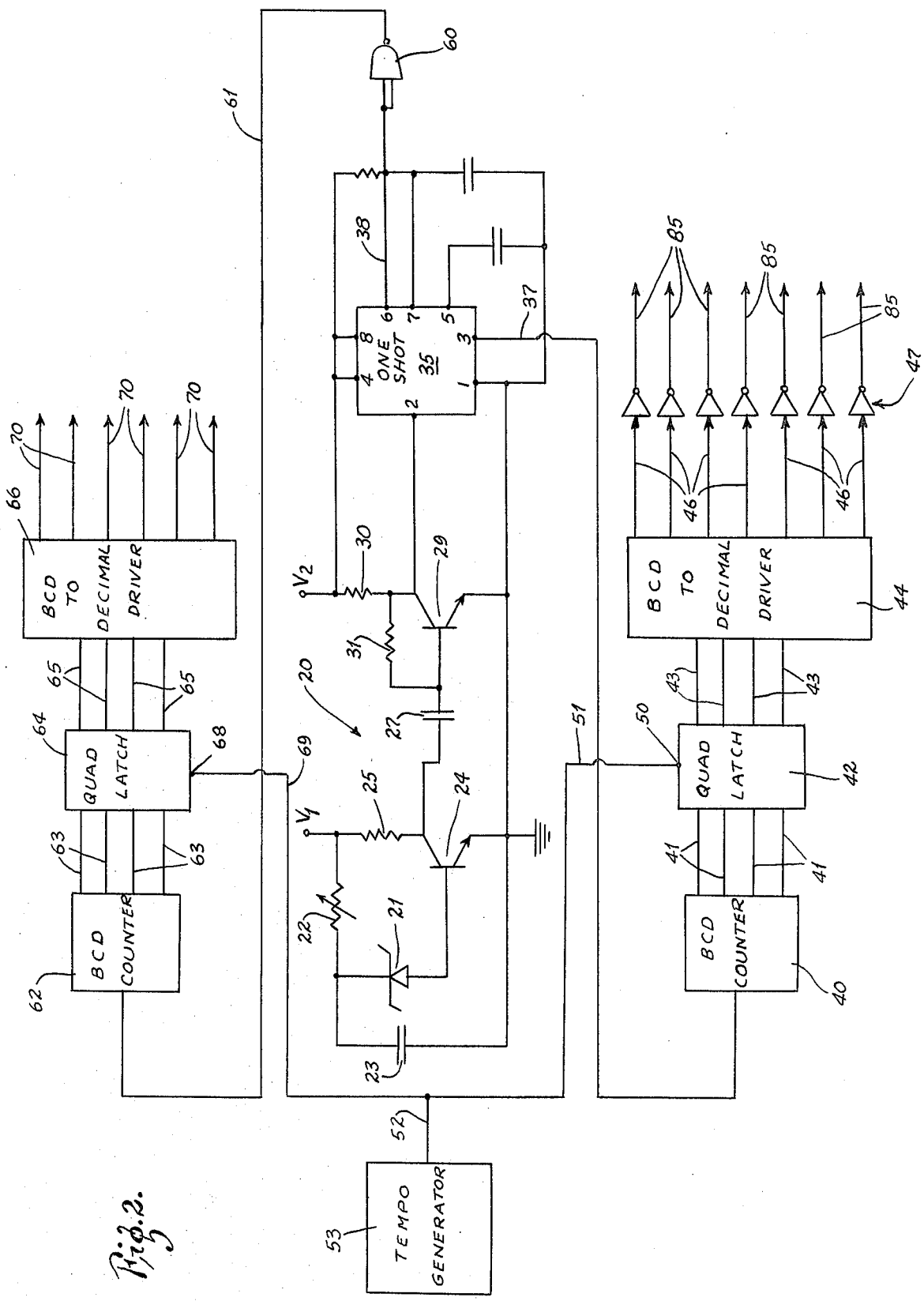
FIG. 2 is an electrical schematic diagram of the tempo generator, random pulse generator, and counter portion of a circuit used with this invention.

The remaining figures of the drawing show the electrical schematic diagrams for activating the various lights shown in FIG. 1. Referring first to FIG. 2, there is shown a random generator circuit 20 comprising a Zener diode 21, one side of which is connected to a variable resistor 22 and a capacitor 23, and the other side of which is connected to the base of a transistor 24. The emitter of the transistor 24 is connected to ground as is the other side of the capacitor 23. The collector of the transistor 24 is connected through a resistor 25 to a voltage source $V_1$. The other side of the variable resistor 22 is also connected to the source $V_1$.

The output of the transistor 24 at its collector is coupled through a capacitor 27 to the base of a transistor 29, the emitter of which is grounded. The collector of the transistor 29 is connected through a resistor 30 to a voltage source $V_2$. A resistor 31 is connected between the base and collector of the transistor 29.

The output of the transistor 29 from its collector is connected to a terminal designated with the numeral 2 of a one-shot network 35 which is an integrated network of a type commonly known in the art, such as, for example, a Signetics NE 555. Other such one-shot circuits could also be used. The numerals 1 through 8 of the network 35 correspond to those customarily found on the integrated circuit itself which are commonly known in the art. Two outputs are taken from the network 35, one output 37 at the numeral 3 and another output 38 at the numeral 6. The remainder of the network 35 is connected as shown in a manner commonly known in the art to function in a manner to be described.

The purpose of the network 20 is to produce two separate outputs, namely, 37 and 38, each of which is a pulse-type signal with pulses occurring at random periods and where the pulses on the output 37 occur at random relative to the pulses on the output 38.

In operation, this is accomplished through use of the inherent noise generated by the Zener diode 21. The amplitude of the noise generated by the diode 21 is controlled by the variable resistor 22 and then amplified by the transistor circuits 24 and 29 with the amplified signal fed to the input designated 2 of the one-shot network 35. The network 35 is such that it produces at the output 37 a pulse of fixed width whenever it receives a voltage of a given minimum amplitude at its input 2, and also produces at its output 38 a pulse of fixed width whenever the voltage at its input 2 is of a given minimum amplitude, but where the occurrence of the pulses at the output 37 is not necessarily coincident with the occurrence of the pulses at the output 38. Since the signal at the input 2 is amplified random noise, which will attain the given minimum amplitude for the network 35 to operate in a random manner, it follows that the pulses at the outputs 37 and 38 will also occur randomly.

The pulses at the output 37 of the one-shot network 35 are fed to the input of a BCD counter 40 which counts the pulses at its input over a given time interval and generates signals at its output representing the count in binary coded decimal (BCD). These signals are fed over a set of conductors 41 to a quad latch circuit 42, the output of which, also representing a BCD count is fed by means of a set of conductors 43 to the input of a BCD-to-decimal driver 44. The driver 44 converts the BCD signal at its input to a decimal signal at its output which is fed by means of conductors 46 to a set of inverters 47. Hence, the outputs of the inverters 47 are negative potential signals representing counts with only one such output being activated at a time. In this embodiment there are seven outputs representing the seven notes of the musical scale.

The quad latch circuit 42 has an input 50 connected by a conductor 51 to the output 52 of a tempo generator 53. The tempo generator 53, of a type commonly known, has an automatic mode in which pulses are generated at a constant rate, the frequency of which may be selected, and a manual mode in which a pulse is generated at the command of the operator. These pulses are fed to the input 50 of the quad latch circuit 42 such that with each pulse the quad latch circuit transfers the count appearing at its input to its output. In this manner the count represented at the outputs of the inverters 47 is updated with each pulse applied to the input 50 of the quad latch circuit 42. This count will also be random since the frequency of pulses at the input of the counter 40 is random.

The pulses at the output 38 of the network 35 are fed through a circuit 60 and a conductor 61 to the input of another BCD counter 62 identical to the counter 40. The circuit 60 is a NAND gate, as shown, and merely shapes or conditions the pulses at the output 38 for use at the input of the counter 62. The output of the counter 62 is fed through conductors 63 to the input of a quad latch network 64 identical to the quad latch network 50. The output of the circuit 64 is fed through conductors 65 to the input of another BCD-to-decimal driver 66 identical to the driver 44. The quad latch circuit 64 has an input 68 connected by a conductor 69 to the output 52 of the tempo generator 53.

The circuits 62, 64, and 66 operate in the same manner as the circuits 40, 42, and 44 to produce positive potential signals at the output of the driver 66 representing a particular count. This count is updated with each pulse of the tempo generator 53 and is random since the frequency of the pulses at the input of the counter 62 is random. Also, the count at the outputs of the driver 66 is random relative to the count at the outputs of the inverters 47 since the pulses at the output 38 are random relative to the pulses at the output 37.

By way of example only, the BCD counters 40 and 62 each may be an ITT 7490J, the quad latch networks 42 and 64 each may be an ITT 7475N, the drivers 44 and 66 each may be an ITT 7442N, and the circuit 60 may be an ITT 7402N.

Figure 3:
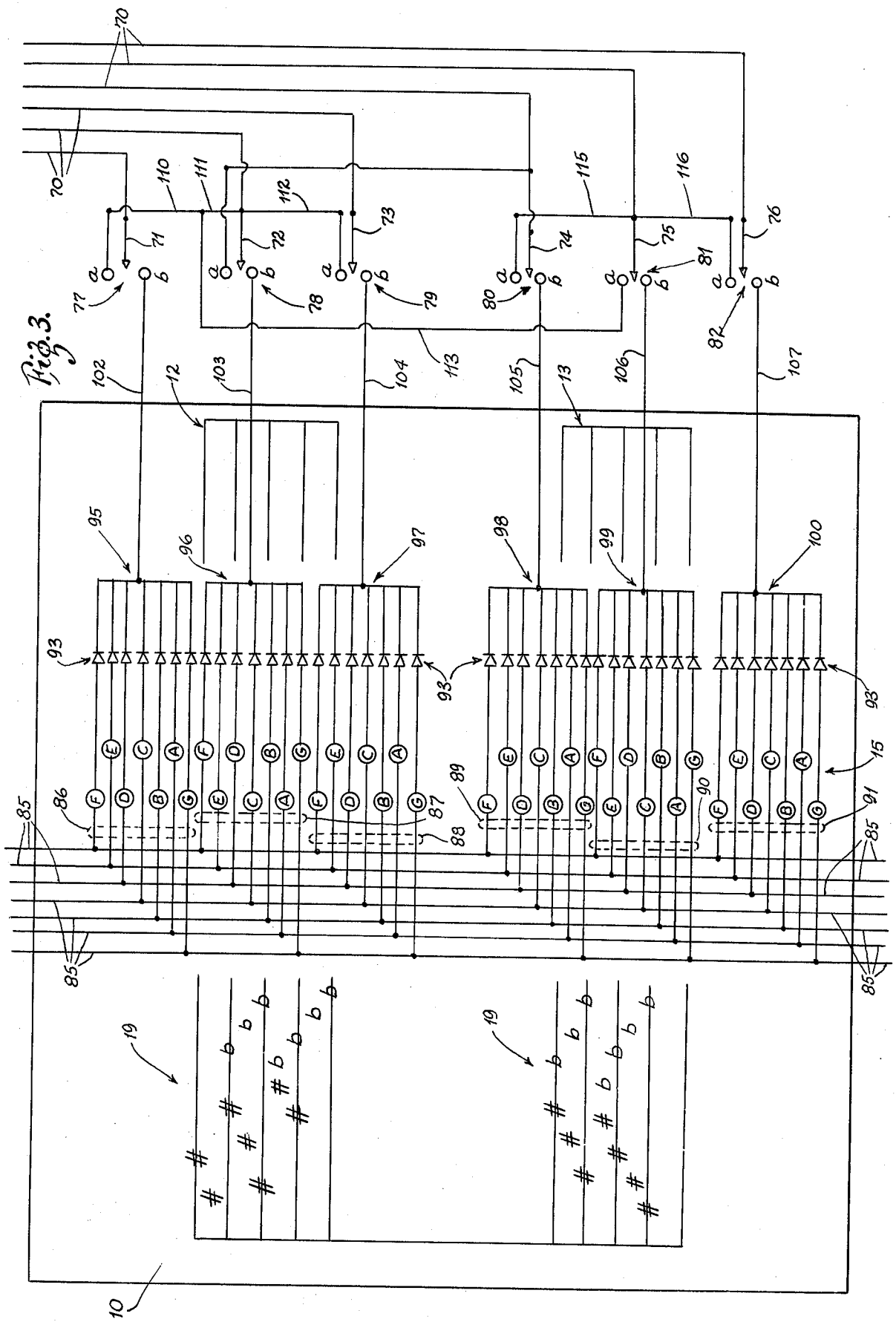
FIG. 3 is a continuation of the circuit of FIG. 2 also schematically illustrating the relationship between the lights of the electrical circuit and the display on the display screen of FIG. 1.

Referring primarily to FIG. 3, the outputs from the driver 66 are connected by a series of conductors 70 to the wiper arms 71 through 76 of a series of switches 77 through 82, respectively. Each conductor in the set of conductors 70 is connected to a separate one of the wiper arms 71 through 76. Each of the switches 76 through 81 has contacts $a$ and $b$.

The sets of lights 15 representing the displayed notes as shown in FIG. 1 are also shown in FIG. 3, with the display screen 10 and scales 12 and 13 superimposed on the circuit of FIG. 3 for the purposes of illustration. Also shown are the lights 19 which will be hereinafter referred to in more detail.

The outputs of the inverters 47 are connected by a set of conductors 85 to each of six sets of conductors 86, 87, 88, 89, 90, and 91, there being as many conductors in each set of conductors 86 through 91 as there are in the set of conductors 85. Each conductor in the set of conductors 85 is connected to a conductor in each set of conductors 86 through 91. As shown in FIG. 3 each of the lights 15 is connected in a different one of the conductors in the sets of conductors 86 through 91. Diodes 93 are connected in series with the lights. The outputs of the diodes associated with each section of conductors 86 through 91 are connected together such that the section of conductors 86 represents a light section 95, the set of conductors 87 represents a light section 96, the set of conductors 88 represents a light section 97, the set of conductors 89 represents a light section 98, the set of conductors 90 represents a light section 99, and the set of conductors 91 represents a light section 100.

The diode outputs of the light section 95 are connected by a conductor 102 to the $b$ terminal of the switch 77, the diode outputs of the light section 96 are connected by a conductor 103 to the $b$ terminal of the switch 78, the diode outputs of the light section 97 are connected by a conductor 104 to the $b$ terminal of the switch 79, the diode outputs of the light section 98 are connected by a conductor 105 to the $b$ terminal of the switch 80, the diode outputs of the light section 99 are connected by a conductor 106 to the $b$ terminal of the switch 81, and the diode outputs of the light section 100 are connected by a conductor 107 to the $b$ terminal of the switch 82. The $a$ terminal of the switch 77 is connected by a conductor 110 and a conductor 111 to the wiper arm of the switch 78, further by a conductor 112 to the terminal $a$ of the switch 79, and by a conductor 113 to the $a$ terminal of the switch 81. The terminal $a$ of the switch 80 is connected by a conductor 115 to the wiper arm of the switch 81, and further by a conductor 116 to the terminal $a$ of the switch 82.

In operation it can be seen from FIG. 3 that when a positive signal appears on a particular conductor of the set of conductors 85, representing a given count, that signal is fed to a corresponding conductor in each set of conductors 86 through 91 so as to apply a signal to one light in each light set 95 through 100. Hence, a total of six lights of the set of lights 15 receive a signal of positive potential at one side. The settings of the switches 77 through 82 determine which of the light sections 95 through 100 are made operable, and the negative signals on the set of conductors 70 determine the particular light section to be activated within the operation light sections.

Only one of the six lights is activated at a time, and the one activated depends on which of the light sections is connected to the one of the conductors in the set of conductors 70 having a negative potential signal thereon representing a count.

The settings of the switches 77 through 82 determine which of the light sections 95 through 100 are operative, that is, which have the possibility of being activated depending on the count on the conductors 70. Regardless of which sections are made operative, only the lights within those sections have a possibility of lighting, and one of the lights within those operative sections will light with every update of the counts on the conductors 85 and 70. Hence, depending on the settings of the switches 77 through 82 all of the sections may be made operative, in which case any one of all of the lights 15 has the possibility of lighting with each count update, or at the other extreme only a single section may be made operative in which case only the lights within that section have the possibility of lighting with one of them lighting for each count update. The only limitation is that in this described preferred embodiment, at least one of the sections 96 or 99 must be made operative for a light within the operative sections to be activated with each count update. Otherwise, if one of the sections 96 or 99 is not made operative, there is a possibility that no light will be activated with a count update.

By way of example, suppose that the wiper arms of all of the switches 77 through 82 are connected to the $b$ terminal. In this condition a negative potential signal on any one of the conductors 70 representing a random count will be fed through the appropriate switch to make one of the light sections 95 through 100 operative. At the same time one of the conductors 85 will have a positive potential signal representing a random count which will be applied to one light within each light section. However, since only one of the light sections receives the negative potential signal through the appropriate switch, only the one light within that light section will be activated and hence only one note will be displayed on the screen 10. With this setting of the switches, as the counts on the conductors 70 and 85 change at random, different light sections will receive negative signals at random and different lights within each light section will receive positive signals at random to randomly display a note of the screen with each count update.

Supposing, however, that only the switch 78 is connected to the $b$ terminal and the other switches connected to the $a$ terminals. In this condition a signal on the second conductor of the conductors 70 (reading from left to right in FIG. 3), representing a particular count, will apply a negative potential to the light section 96 through the $b$ terminal and one of the lights within the section 96 will be activated.

If a signal appears on the first conductor of the conductors 70, the signal is fed through the $a$ terminal of the switch 77, the conductors 110 and 111, and wiper arms 72 of the switch 78 to again apply a negative signal to the light section 96. If a signal appears on the third conductor of the conductors 70, it is fed through the $a$ terminal of the switch 79, the conductor 112 and the switch 78 to again make the light section 96 operative. If a signal appears on the fourth conductor of the conductors 70, it is fed through the $a$ terminal of the switch 80. the conductor 115, the wiper arm 75 and $a$ terminal of the switch 81, conductors 113 and 111, and the switch 78 to again make the light section 96 operative. If a signal appears on the fifth conductor of the conductors 70, it is fed through the wiper arm 75 and terminal $a$ of the switch 81, the conductors 113 and 111, and the switch 78, to again make the light section 96 operative. If a signal appears on the sixth conductor of the conductors 70, it is fed through the wiper arm 76 and terminal $a$ of the switch 82, the conductor 116, the wiper arm 75 and terminal $a$ of the switch 81, conductors 113 and 111, and the switch 78 to again make the light section 96 operative. It can be seen that with only the switch 78 connected to its $b$ terminal, all of the signals on the conductors 70, regardless of the count thereon, are ultimately fed through the switch 78 to make the light section 96 operative with the other light sections always remaining inoperative. With each update of the count on the conductors 95 and 70, one light within the light section 96 will be activated.

A similar analysis will show that, except for the limitation that either the switch 78 or 81 must be in its $b$ position so that at least either the light section 96 or the light section 99 is operative, any one or more of the light sections 95 through 100 can be made operative by placing its corresponding switch 77 through 82 in its *b* position. This feature allows the operator of the device of this invention to narrow the range of possible notes to be displayed randomly on the screen, which is particularly useful, for example, where the student is having difficulty only with notes within a narrow range.

Figure 4:
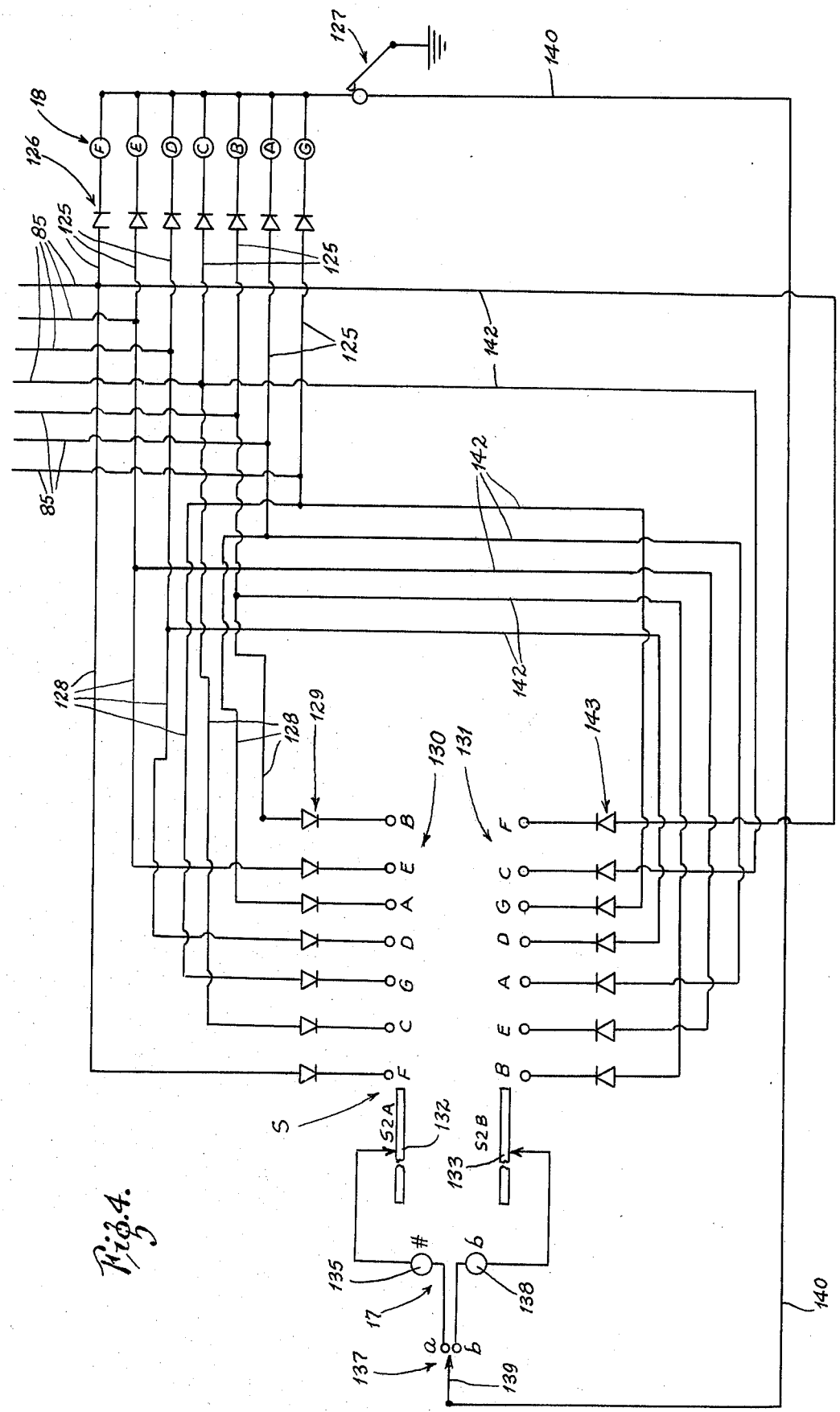
FIG. 4, which is a continuation of FIG. 2, is an electrical schematic diagram of the note identifying circuit of this invention.

In FIG. 4 there is shown the circuit for activating the lights 17 and 18 shown in FIG. 1.

The signals on the conductors 85, representing a random count with each update pulse, are also fed through a set of conductors 125 and diodes 126 to the lights 18 representing the notes G, A, B, C, D, E, and F. These same lights correspond to the seven lights in each light section 95 through 100. The other side of the lights 18 are connected through a switch 127 to ground. The signals on the conductors 85 are also fed through a set of conductors 128 and diodes 129 to terminals F, C, G, D, A, E, and B of a side 130 of a slide switch S. The slide switch S also has a side 131 having terminals B, E, A, D, G, C, and F. The switch S has a slide 132 associated with the terminals of the side 130 and a slide 133 associated with the terminals of the side 131. The slide 132 is connected to a light 135 representing a sharp sign, the other side of which is connected to the *a* terminal of a switch 137. The slide 133 is connected to a light 138 representing a flat sign, the other side of which is connected to the *b* terminal of the switch 137. The wiper arm 139 of the switch 137 is connected by a conductor 140 and the switch 127 to ground.

The signals on the conductors 85 are also fed through conductors 142 and diodes 143 to the terminals B, E, A, D, G, C, and F of the side 131 of the switch S.

The operation of the circuit of FIG. 4 is best explained in conjunction with the circuit of FIG. 5, which will first be described.

Figure 5:
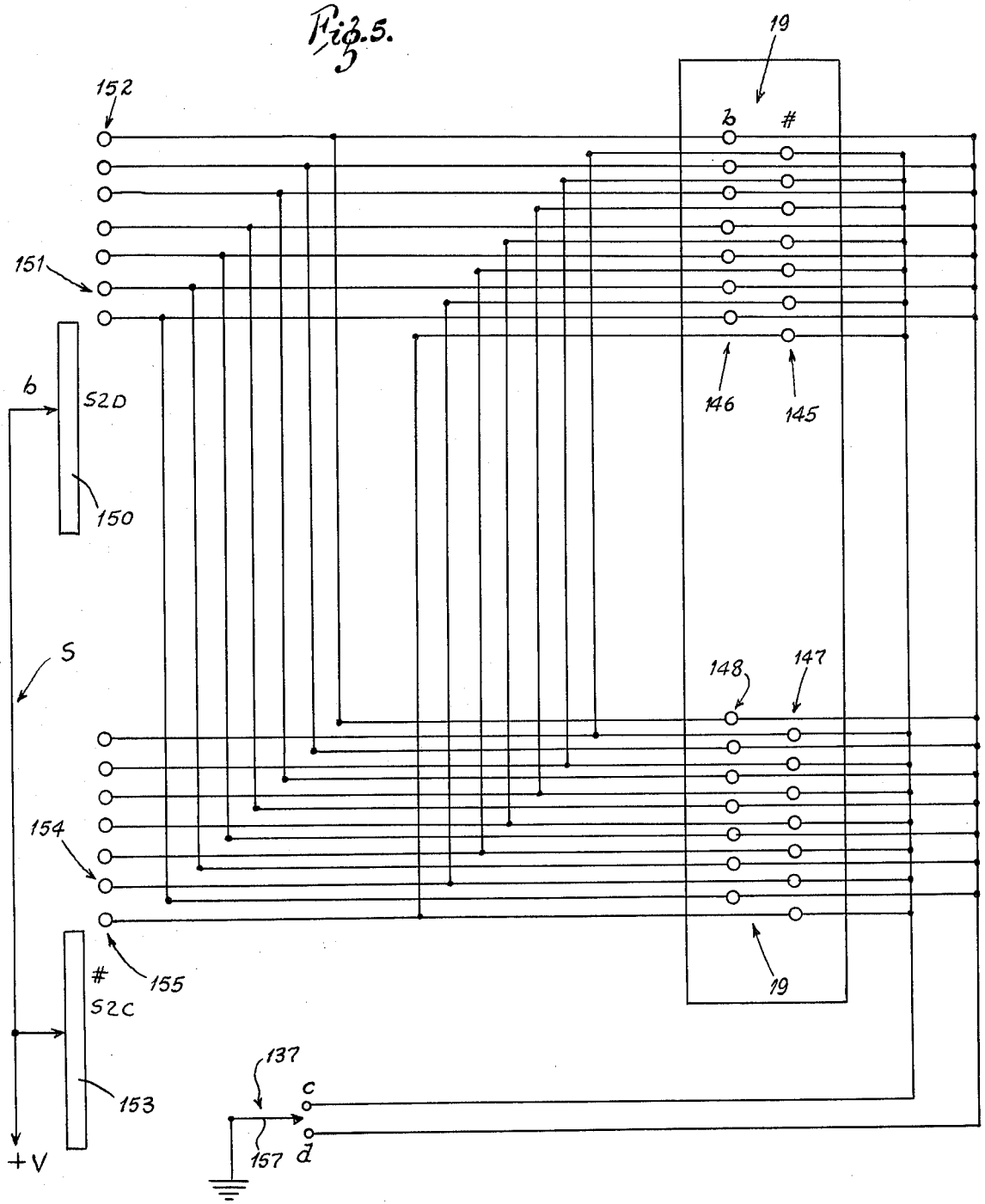
FIG. 5 is an electrical circuit diagram for activating selected sharp or flat designations thereby indicating the key to which the displayed notes are to relate.

The purpose of the circuit of FIG. 5 is to allow the operator of the device to designate on the screen 10 a selected key to which the displayed notes are to relate. The key is musically designated in terms of sharps and flats, which in the device of this invention are represented by selected ones of the lights 19 of FIG. 1. The lights 19 are shown in FIG. 5 and are comprised of a set of lights 145 representing sharp designations on the treble or alto clefs, a set of lights 146 representing flat designations on the treble or alto clefs, a set of lights 147 representing sharp designations on the bass or tenor clefs, and a set of lights 148 representing flat designations on the bass or tenor clefs. There is also shown the same switch S as in FIG. 4 having another slide 150 on a side 151 having a set of terminals 152, and a slide 153 on a side 154 having a set of terminals 155. The slide 150 is ganged with the slide 133 and the slide 153 is ganged with the slide 132. Both of the slides 150 and 153 are connected to a positive voltage source as shown.

The switch 137 of FIG. 4 also appears in FIG. 5 and has additional terminals *c* and *d* and an additional wiper arm 157 ganged to the arm 139 shown in FIG. 4.

The sets of lights 145 and 147 representing the sharp designations each have one side connected to the *c* terminal of the switch 137. The other sides of the lights 145 and 147 are connected by appropriate conductors to corresponding ones of the terminals 155 as shown. One side of each of the lights 146 and 148 representing the flat designations is connected to the *d* terminal of the switch 137. The other side of the lights 146 and 148 are connected by appropriate conductors to corresponding ones of the terminals 152 of the switch S.

In operation of the circuit of FIG. 5, the operator of the device may select any key designation to which the displayed notes are to relate by operation of the switches S and 137. For example, if the key is to be designated by sharps, the switch 137 is placed in its *c* position, thus grounding one side of each of the sets of lights 145 and 147. Then by operating the slide 153, a plus voltage is applied to one or more of the lights 145 and 147 depending on the number of terminals 155 contacted by the slide. In this way any number of sharp designations from one to seven can be selected and will appear on both the treble or tenor and bass or alto clefs as the case may be. To select a key designated by flat symbols, the operation is the same except the switch 137 is placed in the *d* position grounding one side of each of the sets of lights 146 and 148, and the slide 150 is operated to select the desired number of flat symbols. Of course if the key is C, where no sharp or flat symbols are used, the slides 150 and 153 are moved to an off position out of contact with any of the terminals 152 or 155.

In operation of the network of FIG. 4, the notes appearing on the screen can be identified as they appear by the activation of the appropriate one of the lights 18, as well as activation of the appropriate one of the lights 17 indicating whether the note is a sharp or a flat. This too is accomplished by means of the switches S and 137.

To activate the circuit of FIG. 4 the switch 127 is closed to ground one side of the lights 18 and the wiper arm 139 of the switch 137. Each time a signal appears on one of the conductors 85 representing a count, that signal is fed to the appropriate one of the lights 18 to activate that light having the appropriate note designation thereon. The sequence of the lights 18 is identical to the sequence of the lights in each of the light sections 95 through 100 so that the correct note designation will be shown for each note displayed.

If the key is C, where no sharp or flat designations are shown, one of the lights 18 lights for each note displayed. If the key is other than C, with sharp or flat designations selected by operation of the slide 150 or 153 of the switch S, and the positioning of the arm 157 of the switch 137, then the slides 132 and 133 of the Switch S and the wiper arm 139 of the switch 137 are also positioned accordingly. Hence, the slide 132 is ganged to the slide 153 to be positioned in exactly the same manner, the slide 133 is ganged to the slide 150 to be positioned in exactly the same manner, and the wiper arm 137 is ganged to the wiper arm 157 to be positioned in the same manner.

Assuming the wiper arm 157 of the switch 137 is in the *c* position and the slide 153 is positioned to contact a selected number of contacts 155, then the wiper arm 139 is in the *a* position and the slide 132 contacts corresponding ones of the contacts 130. Each time a signal apears on one of the conductors 85, it is fed through the appropriate one of the conductors 128 to one of the terminals 130. If that terminal contacts the slide 132, the light 135 indicating that the displayed note is a sharp will light.

If the wiper arm 157 of the switch 137 is set to the *d* position and the slide 150 set to contact a selected number of the contacts 152, then the wiper arm 139 of the switch 137 is set to the *b* position and the slide 133 is set to engage corresponding ones of the contacts 131. Hence, a signal on one of the conductors 85 representing a given count is also fed through an appropriate one of the conductors 142 to the appropriate one of the terminals 131. If that terminal is engaged by the slide 133, the light 138 will light indicating that the displayed note is a flat.

In this manner the circuit of FIG. 4 can be made to identify by means of the lights 18 the particular note being displayed, and can further identify by means of the lights 17 whether that note is a sharp or a flat depending on the particular key designation selected.

As far as the user of the device is concerned, the operation is very simple. By means of appropriate controls accessible to the operator, the operator can select whether the displayed notes are to be automatically changed or changed by the operator. This is accomplished by either allowing the tempo generator 53 to generate pulses automatically or at the instance of the operator. The operator can also select the frequency of the pulses from the tempo generator thus changing the rate at which the notes change on the display screen.

By means of further controls, namely, the switches 77 through 82, the operator can select which of the light sections 95 through 100 are to be operative thus narrowing the range of notes displayed on the screen. In addition, the operator can by means of the switch S and switch 137 select a particular key designation as shown by the lights 19 to which the notes displayed are to relate, and he can further by means of the switch 127 activate the lights 17 and 18 to identify the notes being displayed and whether they are a sharp or a flat.

Hence, there has been described a novel device for teaching musical note recognition effectively, efficiently, and in an educationally sound manner, and which otherwise fulfills the objects heretofore stated.

Various changes and modifications may be made in this invention, as will be readily apparent to those skilled in the art. Such changes and modifications are within the scope and teaching of this invention as defined by the claims appended hereto.

What is claimed is:

1. A device for teaching musical note recognition comprising a display screen, means on the display screen defining selected musical scales, a series of electrically activated means representing notes on the musical scales, electric circuit means, said electric circuit means including means for generating update signals and means responsive to said update signals for automatically activating random ones of said note representing means.

2. The device of claim 1 wherein the electric circuit means further comprises means for generating said update signals continually and automatically.

3. The device of claim 2 wherein the note representing means are a series of lights which when activated represent notes on the screen.

4. The device of claim 2 further comprising means for deactivating the means for continually and automatically generating the update signals, and manually advancing means for advancing from the generation of one update signal to another, the electrical circuit means further comprising means for randomly activating a note representing means with each manual advance.

5. The device of claim 2 wherein the electric circuit means further comprises means for varying the frequency at which the the update signals are generated.

6. The device of claim 1 including means responsive to the electrical circuit means for indicating the identity of the notes as they are displayed.

7. The device of claim 1 including means responsive to the electrical circuit means for designating a key to which the displayed notes are to relate.

8. The device of claim 7 wherein the key designating means further comprises a series of sharp and flat symbols positioned relative to the scales to indicate selected keys, and means for illuminating selected ones of said sharp or flat symbols, thereby indicating the key.

9. The device of claim 1 wherein the electrical circuit means further comprises means for randomly generating a first series of oscillations, means for randomly generating a second series of oscillations, means for generating a first signal indicative of the number of oscillations of said first series generated during a selected first time interval, means for generating a second signal indicative of the number of oscillations of said second series generated during a second time interval, means responsive to said first and second signals for activating a particular note representing means, each of said note representing means being activated in response to a given set of first and second signals, and means for updating said first and second signals at selected intervals in response to said update signals, each time activating a note representing means, whereby said note representing means are activated in a random manner.

10. The device of claim 9 wherein the note representing means are divided into a select number of groups, a note representing means in each group being responsive to said first signal, and a selected group being responsive to said second signal, there being at least as many possible types of first signals as there are note representing means in each group, and at least as many possible types of second signals as there are groups, whereby for a given set of first and second signals, a given note representing means in a given group is activated.

11. The device of claim 10 further comprising means for restricting the activation of a note representing means to selected groups, and for activating a note representing means within the selected groups with each update of the first and second signals.

12. The device of claim 9 wherein the first and second signal generating means further comprises counter means for counting said first and second series of oscillations separately, and generating said first and second signals, respectively, as indicative of said counts for the respective time interval.

13. The device of claim 12 further comprising a tempo generator which produces oscillations said update signals at a selected rate, and means for updating said counters to begin recounting said first and second series of update signals in response to the oscillations from the tempo generator.

14. The device of claim 13 wherein the electric circuit means further comprises means for varying the rate of signals from the tempo generator, thereby varying the rate at which notes appear on the screen.

15. The device of claim 9 wherein the means for randomly generating said first and second series of oscillations further comprises a diode, means to bias the diode to generate therefrom random noise, and means for generating said first and second series of oscillations in response to the amplitude of said noise.

16. The device of claim 9 further comprising manually advancing means for advancing from the display of one note to another, the electrical circuit means further comprising means for randomly activating a note representing means with each manual advance.

17. The device of claim 9 including means responsive to the electrical circuit means for indicating the identity of the notes as they are displayed.

18. The device of claim 9 including means responsive to the electrical circuit means for designating a key to which the displayed notes are to relate.

19. The device of claim 18 wherein the key designating means further comprises a series of sharp and flat symbols positioned relative to the scales to indicate selected keys, and means for illuminating selected ones of said sharp or flat symbols.

20. The device of claim 9 further comprising means for updating said first and second signals continually and automatically.

* * * * *